US007379478B1

(12) United States Patent
Mantha

(10) Patent No.: US 7,379,478 B1
(45) Date of Patent: May 27, 2008

(54) SYSTEM AND METHOD FOR ALLOCATING POWER

(75) Inventor: Ramesh Mantha, Toronto (CA)

(73) Assignee: Soma Networks, Inc., San Francisco, CA (US)

( * ) Notice: Subject to any disclaimer, the term of this patent is extended or adjusted under 35 U.S.C. 154(b) by 1542 days.

(21) Appl. No.: 09/722,634

(22) Filed: Nov. 28, 2000

(30) Foreign Application Priority Data

Sep. 14, 2000 (CA) .................................. 2319287

(51) Int. Cl.
H04B 7/26 (2006.01)
(52) U.S. Cl. ........................................ 370/493; 455/522
(58) Field of Classification Search ................ 370/328, 370/311, 484, 493, 252; 455/73, 561, 186, 455/1, 13.4, 522, 69, 405; 375/260, 335
See application file for complete search history.

(56) References Cited

U.S. PATENT DOCUMENTS

| | | | | | |
|---|---|---|---|---|---|
| 4,419,758 | A | * | 12/1983 | Dorey ........................... | 455/59 |
| 5,056,109 | A | | 10/1991 | Gilhousen et al. .............. | 375/1 |
| 5,257,283 | A | | 10/1993 | Gilhousen et al. .............. | 375/1 |
| 5,265,119 | A | | 11/1993 | Gilhousen et al. .............. | 375/1 |
| 5,267,262 | A | | 11/1993 | Wheatley, III .................. | 375/1 |
| 5,383,219 | A | | 1/1995 | Wheatley, III et al. .......... | 375/1 |
| 5,396,516 | A | | 3/1995 | Padovani et al. ............ | 375/225 |
| 5,485,486 | A | | 1/1996 | Gilhousen et al. .......... | 375/205 |
| 5,539,728 | A | * | 7/1996 | Gaiani et al. ................ | 370/342 |
| 5,603,096 | A | | 2/1997 | Gilhousen et al. ............ | 455/69 |
| 5,634,195 | A | | 5/1997 | Sawyer | |
| 5,714,944 | A | * | 2/1998 | Shimizu ................... | 455/186.1 |
| 5,822,318 | A | | 10/1998 | Tiedemann, Jr. et al. ... | 370/391 |
| 5,893,035 | A | | 4/1999 | Chen ........................... | 455/522 |
| 5,933,781 | A | | 8/1999 | Willenegger et al. ....... | 455/522 |
| 5,960,361 | A | | 9/1999 | Chen ........................... | 455/522 |
| 5,982,760 | A | | 11/1999 | Chen ........................... | 370/335 |
| 5,991,284 | A | | 11/1999 | Willenegger et al. ....... | 370/335 |
| 6,035,209 | A | | 3/2000 | Tiedemann, Jr. et al. ... | 455/522 |
| 6,070,085 | A | | 5/2000 | Bender et al. .............. | 455/522 |
| 6,134,274 | A | * | 10/2000 | Sankaranarayanan et al. ........................ | 375/295 |
| 6,219,343 | B1 | * | 4/2001 | Honkasalo et al. ......... | 370/335 |
| 6,272,124 | B1 | * | 8/2001 | Ahn et al. .................. | 370/342 |
| 6,304,593 | B1 | * | 10/2001 | Alouini et al. ............. | 375/216 |

(Continued)

FOREIGN PATENT DOCUMENTS

EP 1 011 208 6/2000

(Continued)

Primary Examiner—Wing Chan
Assistant Examiner—Duc Duong
(74) Attorney, Agent, or Firm—Katten Muchin Rosenman LLP

(57) ABSTRACT

The present invention provides a novel system, method and apparatus for allocating power between at least two communication services that share a common power output limit. Two communication services particularly suited for the present invention are voice services and data services transmitted on the downlink of a wireless network. An embodiment of the method includes determining the actual consumption of power on the voice channels of the wireless network during a given time period, and allocating substantially the same amount of power to the voice channels for the next time period, thus allowing for the allocation of the remaining amount of power to the data services, and thereby allowing, for example, increased modulation of the data services and thereby improve overall rates of data transfer and/or reliability of data transmission.

10 Claims, 8 Drawing Sheets

U.S. PATENT DOCUMENTS

| | | |
|---|---|---|
| 6,400,773 B1 * | 6/2002 | Krongold et al. ............ 370/484 |
| 6,463,295 B1 * | 10/2002 | Yun ............................ 455/522 |
| 6,590,873 B1 * | 7/2003 | Li et al. ...................... 370/318 |
| 6,628,954 B1 | 9/2003 | McGowan et al. ......... 455/461 |
| 6,850,506 B1 * | 2/2005 | Holtzman et al. .......... 370/335 |
| 6,859,446 B1 | 2/2005 | Gopalakrishnan et al. .. 370/335 |
| 6,947,490 B1 * | 9/2005 | Edwards et al. ............ 375/261 |

FOREIGN PATENT DOCUMENTS

| | | |
|---|---|---|
| WO | WO 98 59449 | 12/1998 |

* cited by examiner ic # SYSTEM AND METHOD FOR ALLOCATING POWER

FIELD OF THE INVENTION

The present invention relates to a system, apparatus and method of providing enhanced features in a telecommunication system. More specifically, the present invention relates to allocating a power budget between at least two communication services so that the entire power budget is substantially consumed.

BACKGROUND OF THE INVENTION

Various forms of modern wireless communications systems are well known. For example, cellular wireless voice services are now widely deployed in industrialized nations, and technology improvements are expected to enhance and expand cellular wireless services and lead to further deployment.

Accompanying the increased deployment of wireless voice services is an increased demand for wireless data services, such as web-browsing, email and the like. The demand for both types of services reflects the well-identified trend towards the convergence of traditional voice and data services. In particular, wireless local loop (WLL) systems are expected to become a viable alternative to the wired local loop telephone services offered by the existing local telephone companies throughout North America. However, in order to effectively compete with the existing local telephone companies, it is expected that WLL systems will need to provide both toil-quality voice services and high-speed data services.

Both mobile and WLL wireless services will have to provide any voice and data services within prescribed power budgets, as known to those of skill in the art. For example, power-control features are usually incorporated into wireless base stations to ensure that services are offered within government prescribed power budgets.

Various power management techniques are known. In IS-95, for example, it is known to rely on certain characteristics of voice telephone calls to assist in managing power output. Specifically, it is known that during a typical two-way voice telephone call over a wireless voice channel, each party will only speak, on average, for about one-half of the time that the channel is open ("Fifty-percent duty cycle"). This fifty-percent duty cycle can be used on the downlink (i.e. from the base station to the subscriber station), to reduce the amount of power allocated to the voice channels, and thus help keep the power output from the base station within the government-prescribed power budget. However, since the fifty-percent duty cycle is merely an average level of power consumption, over any given time-period the actual power consumed on a voice channel can exceed fifty-percent, thus requiring the allocation of additional power to voice channels in order to accommodate peak power usages.

Keeping the power output within the government-prescribed power budget in a combined voice and data system presents different challenges. In such systems, it is known to allocate a fixed level of power to the voice channels in substantially the same manner as described in the previous paragraph, i.e. the allocation to the voice services is based, at least in part, on the fifty-percent duty cycle. The remainder of the power budget is then allocated to the data channels. On the whole, these power allocations remain fixed for a given base station. However, this method leads to the disadvantage that, when the actual amount of voice traffic over a given time period requires less than the level of allocated power, then the remaining power is wasted.

SUMMARY OF THE INVENTION

It is an object of the present invention to provide a novel system, apparatus and method of allocating power that obviates or mitigates at least one of the above-identified disadvantages of the prior art.

In an aspect of the invention, there is provided a system for allocating a power budget between at least two communication services. The system includes one or more receiving-stations. In the aggregate, the receiving-stations are operable to receive at least two different communication services. For example, where the system has only one receiving station, then the one receiving station is operable to receive all of the communication services. Similarly, where the system has two or more receiving stations, then at least one of the receiving-stations is operable to receive one of the communication services, and the remaining receiving-stations are operable to receive the remaining communication services.

The system also comprises a transmitting-station for transmitting each of the services to the receiving-stations using a portion of the power budget for each of the services. The power budget is allocated between the portions according to an allocation criteria so that the power budget is substantially consumed.

The transmitting-station of the system is typically a wireless base station and the at least one receiving-station is typically a wireless subscriber station.

One of the services is a usually voice service, and the second service is usually a data service.

Typically, the allocation criteria used in the system includes the allocation of power to the voice service for a subsequent time period based on the actual power consumed by the voice service for a known time period. More particularly, the known time period is typically a current time period and the subsequent time period is typically the time period that immediately follows the current time period.

It is believed that the time periods can be from about one millisecond to about forty milliseconds. It is also believed that the time periods can be from about two milliseconds to about thirty milliseconds. It is additionally believed that the lime periods can also be from about five milliseconds to about twenty milliseconds. Furthermore, the time periods can also be from about seven milliseconds to about fifteen milliseconds. In a presently preferred embodiment, the time periods are each about ten milliseconds.

In another aspect of the invention, there is provided a method of allocating a power budget between communication services comprising the steps of:

predicting power requirements for at least one communication service during a future time period; and, allocating a portion of the power budget to each of the communication services based on the prediction.

In particular, the prediction step of the method typically includes determining the actual power consumption for one of the at least one communication services during a current time period and the allocating step of the method includes allocating a portion equal to the actual power consumption to the one of the at least one communication services and allocating a remaining portion to a remainder of the at least one communication services.

In another aspect of the invention, there is provided a method of allocating a power budget between communication services comprising the steps of:

(i) for an initial time period, allocating the power budget between a plurality of communication services over a wireless link according to a predefined allocation;

(ii) for a current time period, establishing the communication services according to the allocation;

(iii) for the current time period, determining actual power consumption of at least one of the services;

(iv) for a future time period, allocating at least an equivalent amount of power as the actual power consumption determined at step (iii) to the at least one of the services;

(v) for the future time period, allocating a remaining amount of power to a remainder of the services, the remaining amount being an amount that was unallocated to the at least one of the services; and, (vi) repeating steps (ii)-(v) for the future time period.

The present invention provides a novel system, method and apparatus for allocating power between at least two communication services that share a common power budget. Two communication services particularly suited for the present invention are voice services and data services transmitted on the downlink of a wireless network. An embodiment of the invention includes determining the actual consumption of power on the voice channels of the wireless network during a given time period, and allocating substantially the same amount of power to the voice channels for the next time period. The remaining power is then allocated to the data services, and thereby allowing, for example, increased modulation of the data services and which can improve effective data rates and/or reliability of data transmission for that time period.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
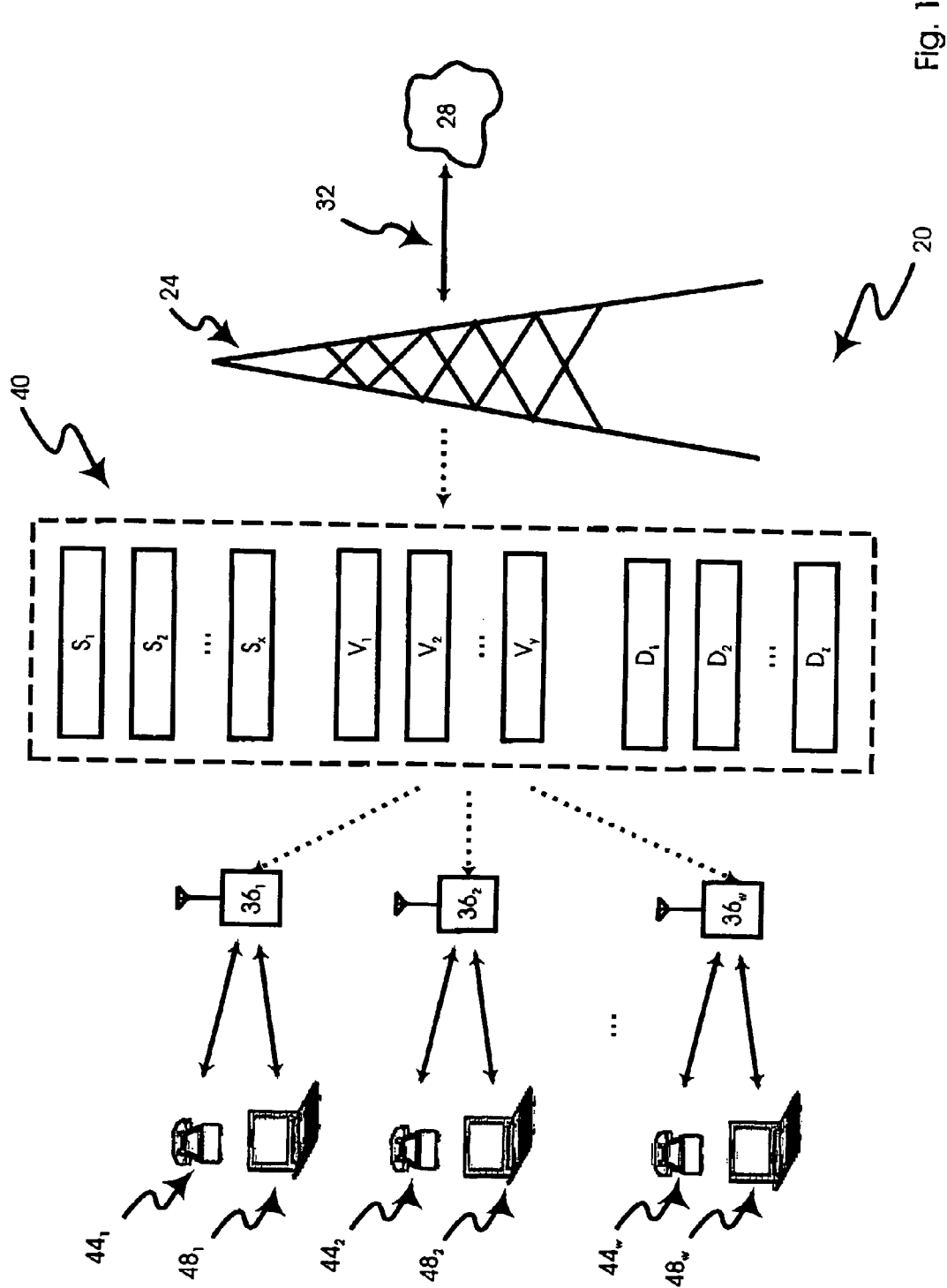
FIG. 1 is a schematic representation of a system for allocating power in accordance with an embodiment of the invention.

Referring now to FIG. 1, a system for allocating power between different services is indicated generally at 20. System 20 includes a wireless base station 24 that connects, through appropriate gateways, to a communication network 28 via a backhaul 32. Network 28 is typically the public switched telephone network (PSTN) combined with a packet switched data network, such as the Internet. Backhaul 32 can be any known type of backhaul link between wireless base station 24 and network 28, such as a T1, T3, OC1 or a wireless microwave link.

Base station 24 has a transmitter which is used for transmitting signaling information, voice service and data services to a plurality of subscriber stations $36_1, 36_2 \ldots 36_w$ via a wireless downlink 40. (While not shown in FIG. 1, system 20 typically includes a wireless uplink for carrying traffic from subscriber stations 36 to base station 40.) Base station 24 also includes a processing unit for determining appropriate packaging (i.e. modulation and/or forward error correction ("FEC")) for the voice and data services, and to transmit the information about the packaging as signaling information.

Each subscriber station 36 has a receiver that is operable to receive, from base station 24, signaling information, voice services and data services. Each subscriber station 36 also includes a processing unit and is further operable to process (i.e. unpackaging by demodulating or utilizing FEC) the received voice and data services according to instructions contained in signaling information received from base station 24. Accordingly, each subscriber station 36 is connected to a voice terminal 44 such as a plain old telephone system (POTS) telephone, and a data terminal 48, such as a laptop computer equipped with a network interface card (NIC). In general, it will be understood that each voice terminal 44 is operable to process voice telephone calls carried over the PSTN portion of network 28, while data terminal 48 is operable to process data applications carried over the packet switched data network portion of network 28.

In a presently preferred embodiment, each subscriber station 36 is fixed within a subscriber's premises and thus system 20 is part of a wireless local loop (WLL). However, it is also contemplated that the present invention is applicable to mobile or nomadic subscriber stations, such as web-enabled mobile cellular phones. It will thus be apparent that each voice terminal 44 and its respective data terminal 48 can be combined with its respective subscriber station 36 into a single intelligent device, such as a cellular phone with a built-in web browser or any other intelligent device that is operable to process both voice and data.

In a presently preferred embodiment, wireless downlink 40 is based on any known digitally-based radio protocol, such as CDMA, OFDM, FDMA or TDMA. Downlink 40 also includes at least one signaling channel $S_1, S_2 \ldots S_x$; at least one voice channel $V_1, V_2 \ldots V_y$; and, at least one data channel $D_1, D_2 \ldots D_z$. Signaling channels S contain signaling information, and are used to maintain each subscriber station 36 communication with base station 24. Signaling channels S can include, for example, traditional IS-95 pilot channels and synch channels and the like, as needed to operate system 20. Using signaling channels S, base station 24 and subscriber stations 36 are operable to, in cooperation, dynamically establish one or more voice channels V and/or one or more data channels D to carry a respective voice and/or data service from base station 24 to one or more subscriber stations 36. Such establishment of channels can be performed, as needed, depending on whether a voice and/or data service is required by a subscriber respective to the particular subscriber station. Such negotiation for the establishing (or dismantling) of voice channels V and/or data channels D can be performed over signaling channels S.

Thus, as used herein, "establishing" a channel includes the connection of a downlink service from base station 24 and one or more subscriber stations 36 using a voice channel V and/or a data channel D, as appropriate. Furthermore, the term "establishing" also includes the configuration of such channels over a given time period in accordance with QoS requirements and available system resources. For example, the "establishing" of a data channel D includes the modulation and FEC of the data channel D. In the present embodiment, levels of modulation or FEC are influenced by the amount of power allocated to that data channel D and the reception-quality (i.e. measured as signal-to-noise ratio or SNR in a CDMA system) experienced by a receiving subscriber station 36.

Similarly, "dismantling" a channel means eliminating the connection and returning the radio resources of the dismantled channel to the pool of radio resources available for future establishment of channels over downlink 40.

One suitable structure for downlink 40 is discussed in Communication Structure With Channels Configured Responsive to Reception Quality filed in the Canadian Patent Office on May 30, 2000 and assigned Application No. 2,310,188 ("2,310,188"). Data channels D in the present invention can be analogous to the connectionless shared data channels discussed in 2,310,188 whereby one or more subscriber stations 36 can 'listen" to the data channel D and extract packets addressed to a respective subscriber station 36 from the data channel. In contrast, each voice channel V in the present invention can be analogous to the connection-like dedicated voice channels discussed in 2,310,188, whereby the channel behaves like a dedicated wired voice telephone connection.

However, other ways of structuring downlink 40 to provide combined voice and data services will occur to those of skill in the art and are within the scope of the invention. For example, one or more data channels D and/or voice channels V can be permanently established for communication of a data service and/or voice service, respectively, with a given subscriber station 36. Similarly, each subscriber station 36 within system 20 need not be capable of both voice service and data services, as long as at least one subscriber station 36 is for voice services and another one of the subscriber stations 36 is for data services. In general, it is to be understood that system 20 is operable to carry both voice services and data services over downlink 40, and that there are a variety of ways of structuring the channels that carry such services.

As is known to those of skill in the art, in the U.S.A. and other jurisdictions, service providers utilizing wireless links such as downlink 40 are limited to a specified range of bandwidth and to transmitting within a prescribed power budget (typically expressed as Effective Isotropic Radiated Power or EIRP) by base station 24. In the U.S.A., such limitations are usually prescribed by the Federal Communications Commission (FCC). As will be explained in greater detail below, in the present embodiment this prescribed power budget is allocated between signaling channels S, voice channels V and data channels D such that the entire power budget is substantially utilized.

Before explaining the present embodiment further, however, it is useful to illustrate a prior art method of allocating a power budget between channels. According to a prior art method for allocating power in a system such as system 20, each set of signaling channels S, voice channels V and data channels D have a fixed amount of power allocated to each of these channels. Table I shows an example, over twenty-five time periods, of power allocations and actual power consumption according to the prior art.

Figure 2:
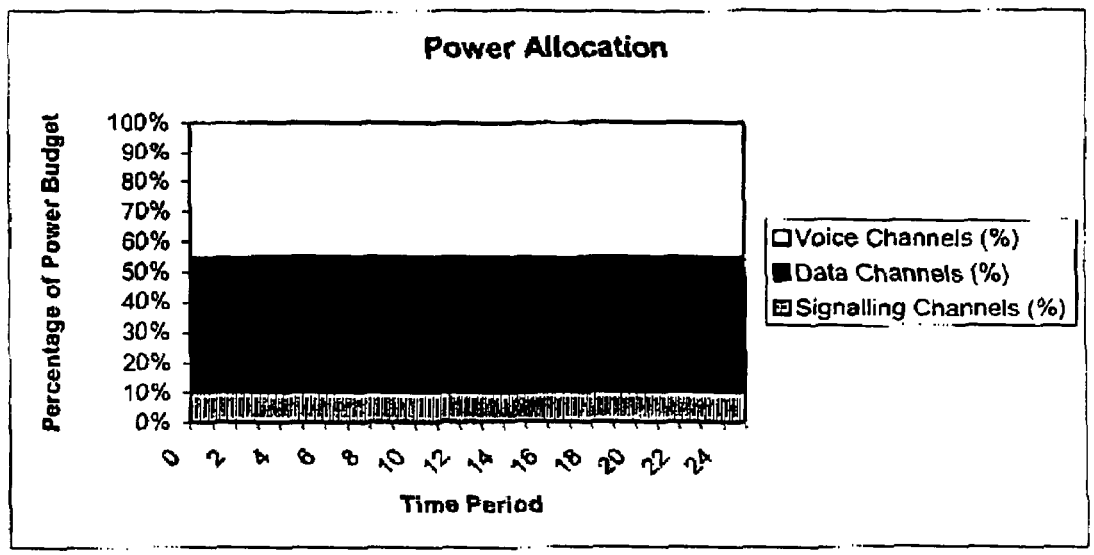
FIG. 2 is a graph showing examples of power allocation according to the prior art; and, FIG. 3 is a graph showing examples of actual power consumption according to the prior art.

FIG. 2 shows a stacked bar-graph of the power allocation for the twenty-five time periods of Table I. The lower bar of FIG. 2 indicates that ten percent of the power budget is allocated to signaling channels S. The middle bar of FIG. 2 indicates that forty-five percent of the power budget is allocated to data channels D, and the top bar of FIG. 2 indicates that forty-five percent of the power budget is allocated to voice channels V.

Figure 3:
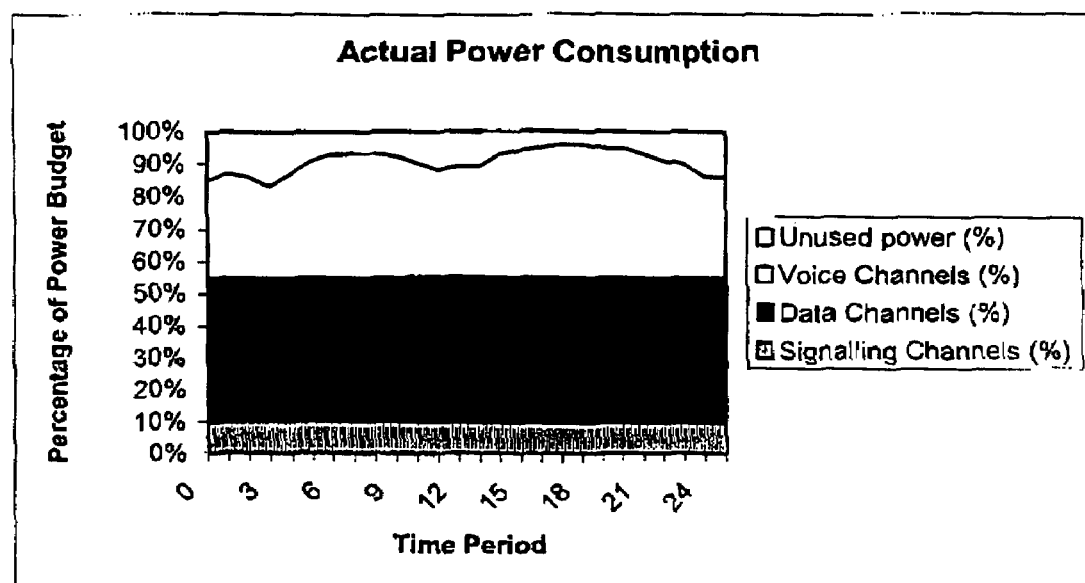

FIG. 3 shows a stacked bar-graph of actual power consumption according to the data in Table I. The lower bar of FIG. 2 indicates that ten percent of the power budget is actually consumed by signaling channels S. The second bar (above the lower bar) of FIG. 2 indicates that forty-five percent of the power budget is actually consumed by data channels D. However, the third bar (above of the second bar) indicates that the amount of the power budget actually consumed by voice channels V varies over time, thus leaving a portion of the power budget unused, as indicated by the top bar of FIG. 3. Overall, it can be seen from Table I, and FIGS. 2 and 3 that the amount of power actually used by signaling channels S and data channels D remains fixed, whereas the amount of power actually used by voice channels V fluctuates, resulting in unused power for at least some of the time periods.

However, in contrast to the prior art, in a present embodiment of the invention base station 24 is operable to allocate the power budget between channels in such a manner as to substantially utilize the entire budget, by utilizing at least a portion of the unused power shown in FIG. 3. In particular, base station 24 is operable to allocate a fixed amount of power to signaling channel S, which can be viewed as a fixed level of overhead power necessary to operate system 20. (It will be understood that the power allocation to signaling channels S can need to fluctuate depending on certain conditions, however, for purposes of explaining the present embodiment it will be assumed that the power allocated to signaling channels S will remain fixed.) Base station 24 is also operable to continually re-allocate power between voice channels V and data channels D according to allocation criteria. According to the present embodiment, the allocation criteria involves determining the amount of power actually consumed by the voice channels V during a present time period and allocating that amount of determined power to the voice channels V for a subsequent time period. The remaining amount of the power budget is then allocated the to data channels D.

Figure 4:
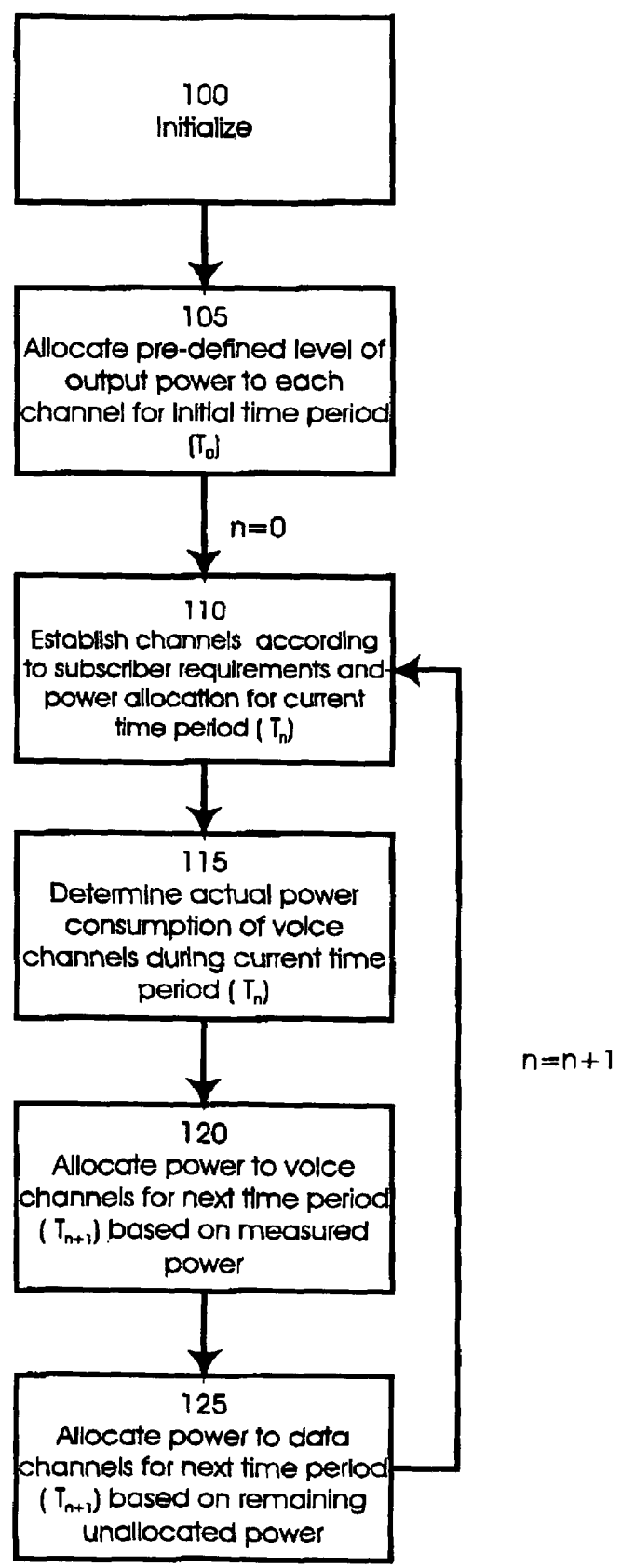
FIG. 4 is a flow-chart showing a method of allocating power in accordance with another embodiment of the invention.

A method for allocating power will now be discussed in accordance with another embodiment of the invention. In order to assist in the explanation of the method, reference will be made to the foregoing discussion of system 20 and FIG. 1. Referring now to FIG. 4, a flowchart of the method of the present embodiment is shown. At step 100, system 20 is initialized. Base station 24 and at least one subscriber station 36 are activated, and communications are initiated therebetween over downlink 40 via signaling channels S.

Figure 5:
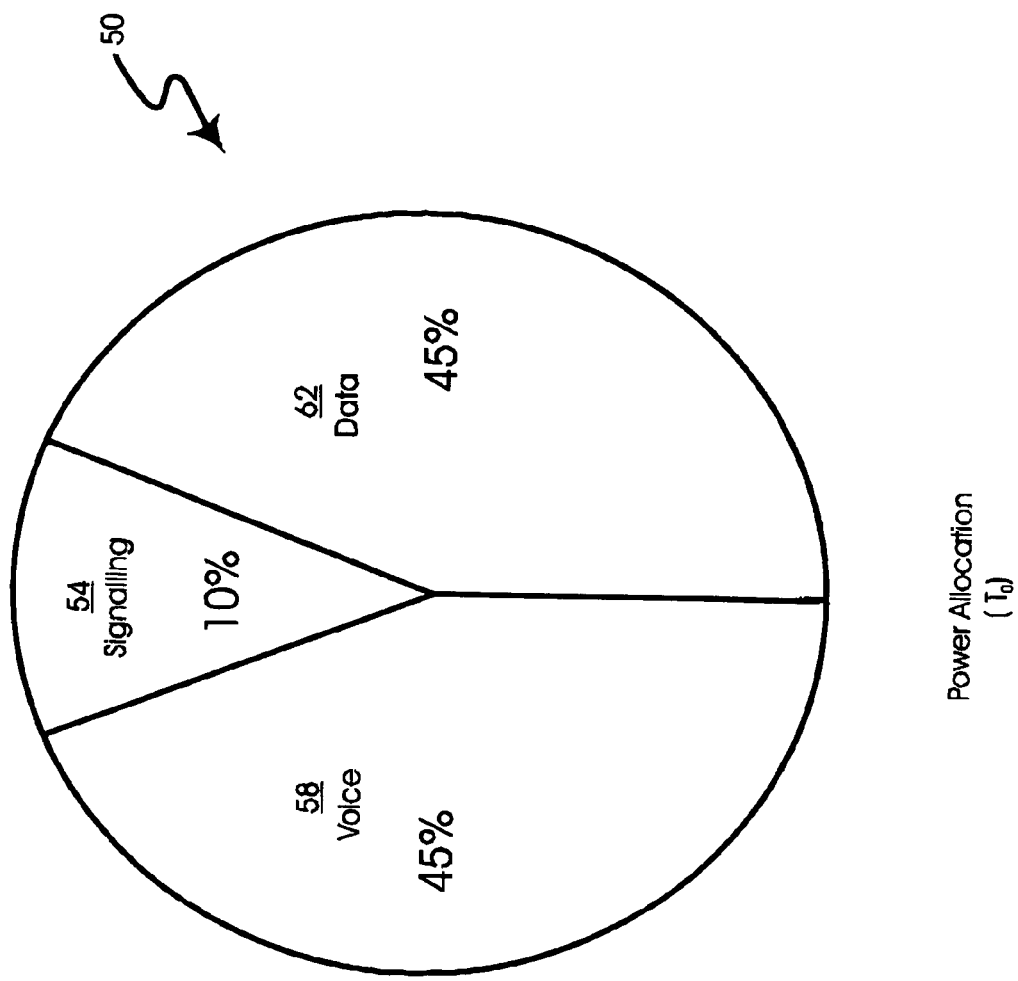
FIG. 5 is a power-allocation pie-graph showing an exemplary initial allocation of power between channels.

At step 105, predefined portions of the power budget are allocated between channels on downlink 40 for the initial time period. (This initial time period is also referred to herein as $T_0$). FIG. 5 shows a power-allocation pie-graph 50 indicating an example of how the power budget assigned to base station 24 can be allocated. Graph 50 represents the entire government-prescribed power budget assigned to system 20. Graph 50 shows that ten percent of the power budget is allocated to signaling channels S, which is represented by sector 54 of graph 50. Graph 50 also shows that forty-five percent the power budget is allocated to voice channels V, this percentage being represented by sector 58 of graph 50. Finally, graph 50 shows the remaining forty-five percent of the power budget is allocated to data channels D, this percentage being represented by sector 62 of graph 50. While graph 50 shows power allocations of ten percent, forty-five percent and forty-five percent for channels S, V, and D, respectively, it will be understood that any percentage can be assigned to each channel, as desired and appropriate for initiating the operation of system 20 at the initial time period ($T_0$).

Figure 6:
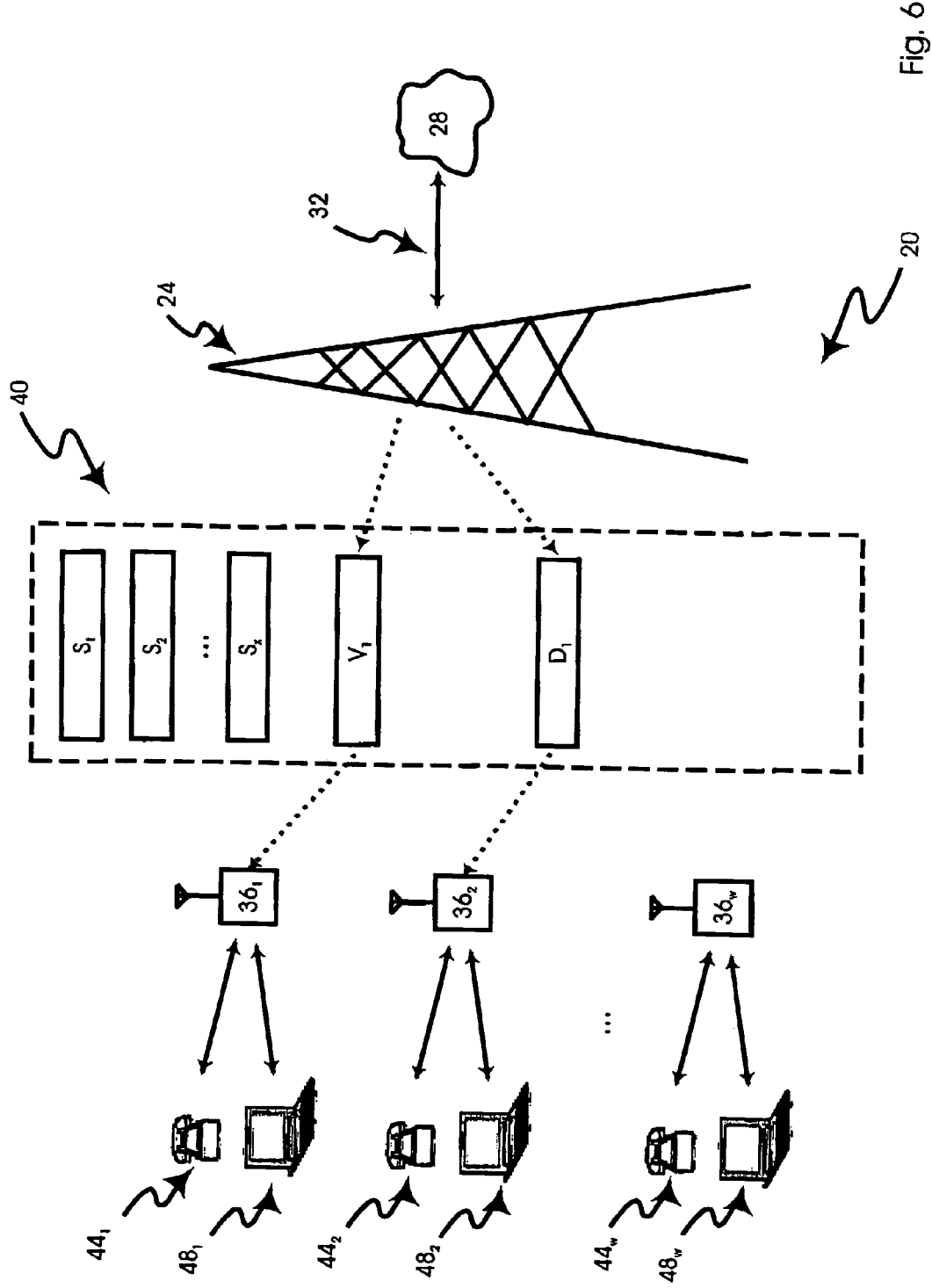
FIG. 6 is the schematic representation of FIG. 1 showing an exemplary establishment of channels from the base station to subscriber stations.

At step 110, voice channels V and data channels D are established according to subscriber requirements and the power allocations at step 105. An example of how step 110 can be implemented is shown in FIG. 6. It is to be understood that the example in FIG. 6 is simplified for the purposes of explaining the present embodiment, and that in practice, it is expected that several voice channels V and at least one data channel D (shared among many subscriber stations 36) will be active at any given time in system 20, as discussed in 2,310,188. As seen in FIG. 6, subscriber station $36_1$ is shown to have initiated a voice service, thus establishing voice channel $V_1$ to carry the voice service from base station 24 to subscriber station $36_1$. Similarly, subscriber station $36_2$ is shown to have initiated a data service, thus establishing data channel $D_1$ to carry the data service from base station 24 to subscriber station $36_2$. The establishment of voice channel $V_1$ and data channel $D_1$ is also made in accordance with the power allocations at step 105. Accordingly, voice channel $V_1$ is allocated forty-five percent of the power-budget, and data channel $D_1$ is also allocated forty-five percent of the power-budget. It is presently preferred that the allocation of power to data channel $D_1$ is then used by base station 24 to transmit data channel $D_1$ at the highest possible rate of modulation and/or highest possible rate of FEC to ensure the highest possible effective bit-rate to subscriber station $36_2$.

Referring again to FIG. 4, the method then advances to step 115, where the percentage of the power budget that is actually consumed by voice channel $V_1$ is determined for a current time period ($T_n$, n=0). It is presently preferred that the duration for each time period be about ten ms ($T_n$32 10 ms), ten ms being the amount of time occupied by one frame of transmitted data in the proposed 3GPP standard. However, other time periods will occur to those of skill in the art and can be selected according to desired system parameters. For example, the inventors believe that where one frame of transmitted data is ten ms, an appropriate time period can be from about one frame to about four frames.

It is presently preferred that this amount of power is determined by examining incoming voice traffic over backhaul 32, for, as is known to those of skill in the art, certain types of encoded voice packets will either include reduced-packets (which indicate silence, often referred to as DTX packets in the emerging 3GPP standard), or will include full packets (containing voice coding). By monitoring reduced-packets for each voice channel V, it can be determined how much power is actually consumed by a given voice channel V during a corresponding time period. While not presently preferred, other means of determining the amount of power actually consumed during a desired time period are also within the scope of the invention, such as directly measuring the amount of power radiated by base station 24.

Figure 7:
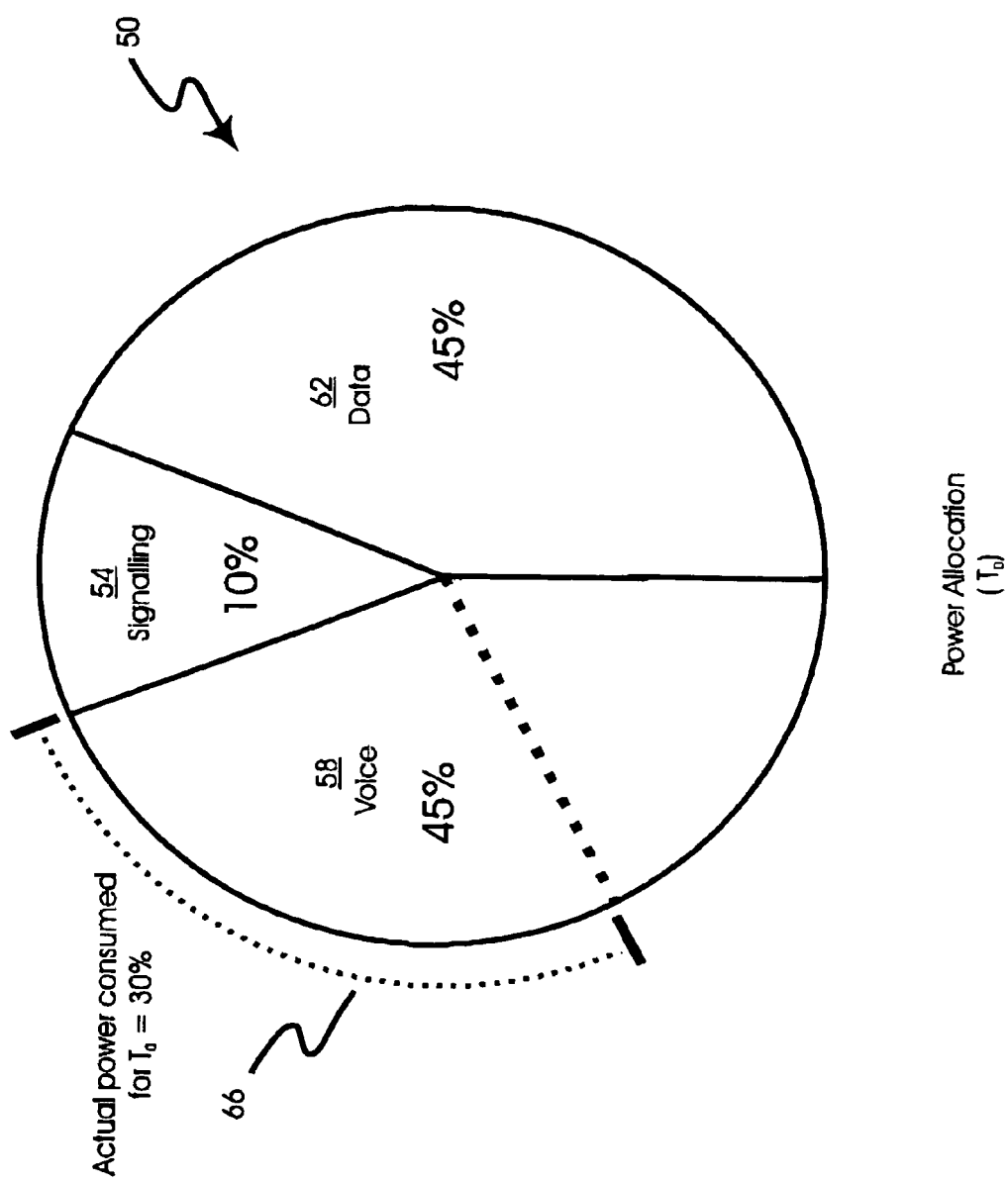
FIG. 7 is the power-allocation pie-graph of FIG. 5 showing the actual power consumed by the voice channels during the initial time period.

FIG. 7 shows an example of the voice power actually consumed, as determined during the initial time period $T_0$ at step 115. This actual amount of power is represented on FIG. 7 as sector 66, which indicates that thirty-percent of the power budget is actually consumed by voice channel $V_1$ during the current time period ($T_n$, n=0).

The method then advances to step 120, at which point the amount of power determined at step 115 is allocated to voice channel $V_1$ for the next time period ($T_{n+1}$, n=0). The allocation at step 120 can also include some additional amount of power to provide a safety margin in the event that the amount of power consumed during the next time period is actually greater than the amount allocated. Thus, in order to preserve a desired level of QoS for voice channel $V_1$, it is presently preferred to allocate an additional predetermined amount of power, (in the present embodiment an exemplary margin of five percent is used), for use by voice channels V during the next time period, should the amount of power actually consumed by voice channels V during the next time period exceed the amount determined at step 115.

The method then advances to step 125, where the remaining power available to base station 24 (i.e. the power that was not allocated to voice channels V at step 120 and otherwise reserved for signaling channels S) is allocated to data channels D.

Figure 8:
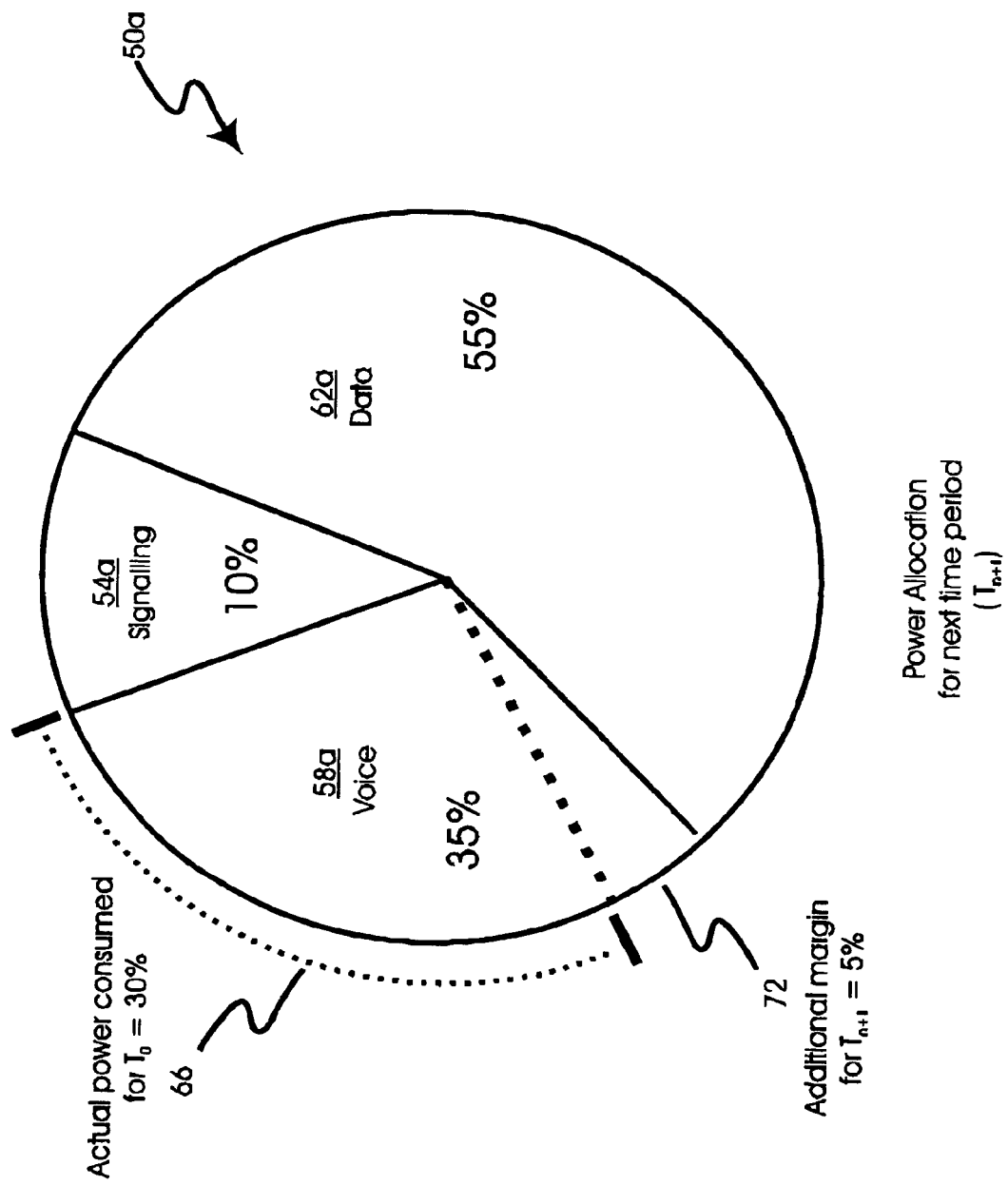
FIG. 8 is a power-allocation pie-graph showing an exemplary allocation of power between channels for a time period subsequent to the time period shown in the pie-graph of FIG. 5.

FIG. 8 shows a power-allocation pie-graph 50a indicating an example of how the total amount of power assigned to base station 24 is allocated for the next time period ($T_{n+1}$, n=0), as a result of the allocations at steps 120 and 125. Graph 50a shows the same percentage of the power-budget is allocated to signaling channels S as was allocated in graph 50 of FIG. 5. This percentage is indicated as sector 54a of graph 50a.

However, while the size of sector 54a remains the same size as sector 54 of graph 50, the remaining sectors of graph 50a differ from the sectors of graph 50. Thus, graph 50a shows a power allocation that reflects the allocation to voice channels V made at step 120, indicated as sector 58a, which is thirty-five percent of the power budget. As previously discussed, thirty-percent of the allocation is derived from the actual amount of power consumed during $T_0$, plus an additional margin of five percent—this margin being indicated at 72 of FIG. 8. Thus, sector 58a represents the percentage of the power-budget allocated for the next time period ($T_{n+1}$, n=0) to voice channels V.

Finally, graph 50a shows the remaining percentage of the power-budget that is allocated to data channels D, which reflects the allocation made at step 125. This power allocation to data channels D is indicated as sector 62a of graph 50a. As previously discussed, the allocation of fifty-five percent to sector 62a reflects the amount of power not allocated to signaling channels S and voice channels 58a. Thus, sector 62a represents the percentage of the power budget allocated for the next time period ($T_{n+1}$, n=0) to data channels D.

At this point the method returns to step 110, during which the time period advances (n=n+1). Voice channels V and data channels D are established according to the demands of subscriber stations 36, and according to the power allocations shown in FIG. 8. It will now be apparent to those of skill in the art that the additional power now allocated to data channels D can be used in a variety of ways to improve the likelihood of successful transmission, and/or the effective rate of data transfer, of data transmitted over data channels D to respective subscriber stations 36. For example, the additional power available to data channels D can be utilized to increase the modulation order and/or increase FEC rates thereby increasing overall data transmission rates and/or overcoming poor reception-qualities.

The method then continuously cycles through steps 110 to 125, thus continually reallocating power to voice channels V and data channels D in such a manner to ensure that the power budget is divided between voice channels V and data channels D and is thus substantially utilized.

Figure 9:
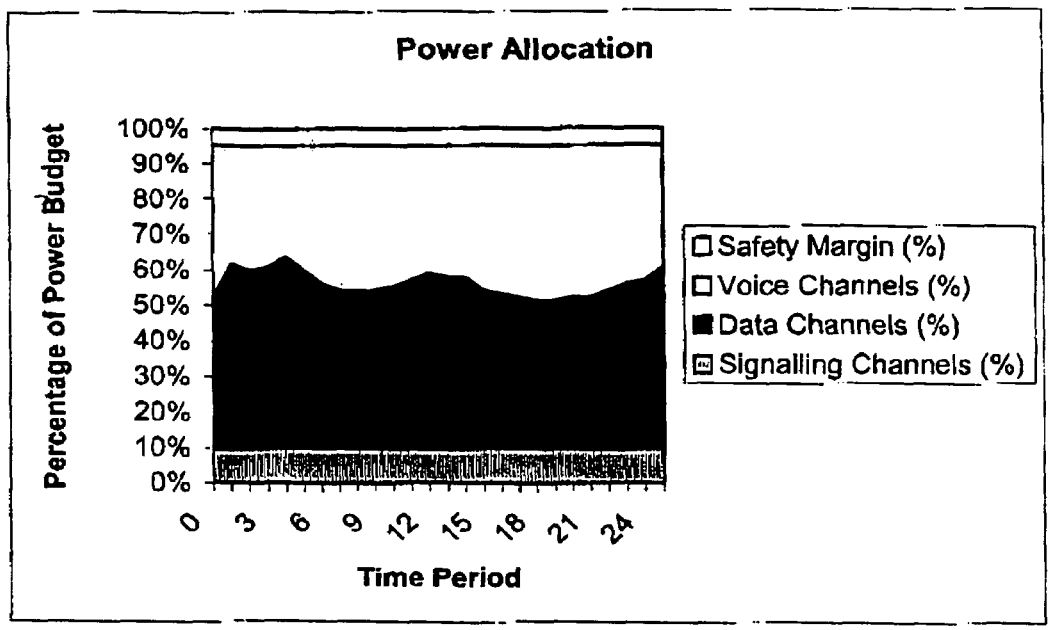
FIG. 9 is a graph showing examples of power allocation for a number of time periods; and, FIG. 10 is a graph showing examples of the actual power consumption during the time periods shown in FIG. 9.
Figure 10:
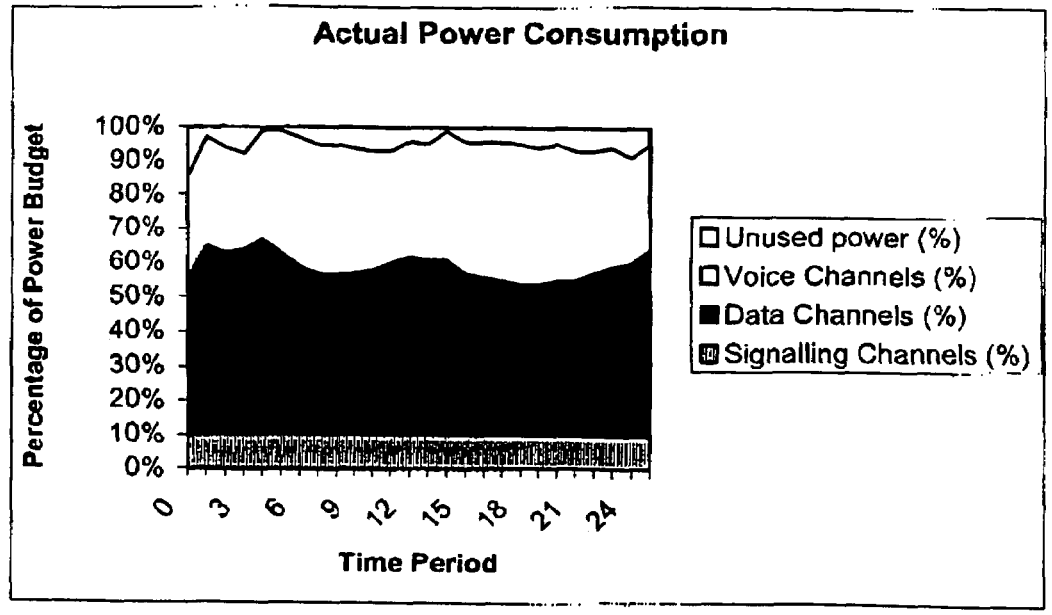

In order to further assist in the understanding of the foregoing, Table II lists an exemplary set of allocated power and actual power consumption over twenty-five time periods when the method cycles through steps 110 to 125, wherein $T_0$ and $T_1$ are based on the foregoing discussion. FIG. 9 and FIG. 10 attached hereto are graphs of the data in Table II, showing power allocation and actual power consumption, respectively. It can be seen that that the formats of Table I, FIG. 2 and FIG. 3 correspond to the formats of Table II, FIG. 9 and FIG. 10, respectively. When Table II (and its associated graphs) is compared with Table I (and its associated graphs), it can be seen that the power budget in Table II is substantially allocated between both voice channels V and data channels D, whereas the power budgeting in Table I (the prior art) shows a larger amount of unused power.

While the embodiments discussed herein are directed to specific implementations of the invention, it will be understood that combinations, sub-sets and variations of the embodiments are within the scope of the invention. For example, the foregoing embodiments discuss the allocation of a fixed amount power to three different types of communication services, yet the present invention is applicable to any system wherein a limited amount of power is to be allocated between at least two different services.

Other variations of the invention are also contemplated. For instance, those of skill in the art will recognize that the method shown in FIG. 4 uses a Markov model to predict future voice activity—but other criteria and/or operations and/or models can be used to substantially allocate a power budget between different communication services. For example, more sophisticated modeling may involve analyzing a history of voice activity to predict future voice activity, rather than simply using the current level of voice activity to predict future voice activity. Similarly, the prediction can be made for any future time period that can be reasonably predicted, and accordingly, the allocation of power can be for more than one time period subsequent to the time period when the prediction occurs. For example, it can be desired to actually allocate the power budget for two time periods after the period when the prediction is made, should the extra time be necessary to set-up the allocated power and corresponding changes to modulation and forward-error-correction in the base station and the subscriber stations.

While presently more difficult to implement and not presently preferred, it can be also desired to allocate a remaining portion of the power budget to voice services after allocating an initial portion of the power budget to data services based on predicted usages of the data services. While data service usage can be more difficult to predict than voice service usage, it is to be understood that the present invention can be applied to allocating power between more than two services, where at least one of the services has characteristics that allow some degree of prediction through statistics or other means. For example, MPEG video conferencing and FTP transfers are types of data service that have characteristics that allow for some level of prediction. Thus, for example, the present invention can be applied to the allocation of power between an MPEG video conference and a traditional data service, such as web-browsing.

Allocation criteria can also be influenced by different business models and pricing schemes. For example, subscribers at different subscriber stations may pay different fees for different levels of service, such as desired voice quality or effective data rates. Thus, for example, where one subscriber pays for highly quality voice service (e.g. 32 kb/s), then the margin allocated to subscriber's voice service may be higher than a subscriber who pays for lower quality voice service (e.g 8 kb/s).

While the embodiments herein are directed to allocating power on a wireless downlink, it is contemplated that the present invention can be modified for use on other types of transmissions of more than one type of service using a given power budget. For instance, on an uplink from a subscriber station to a base station, the base station will typically assign a power budget to the subscriber station. When such an uplink is carrying both a voice and a data service, the present invention can be used to allow the subscriber station to allocate power between the voice and data services, and thereby increase effective data rates.

While the embodiments discussed herein refer to the allocation of an additional safety margin of power to voice channels for the next time period, it is to be understood that such a margin may not be necessary or can be chosen based on system QoS requirements. More specifically, the inventor has determined that the likelihood of large fluctuations in overall power requirements for all voice channels decreases as the number of active voice channels increases. In other words, where a large number of voice channels V are active during a given time period $T_n$) then the amount of margin allocated to all voice channels V can be reduced and/or eliminated, as the amount of change of power between time periods $T_n$ will be less for a large number of voice channels V. Thus, the margin level, if any, can be chosen based on the number of voice channels V that are active during any given time period.

The amount of margin can also be chosen using other or additional criteria. For example, where system 20 is on a boundary of network coverage (i.e. not adjacent to other base stations 24), then interference with adjacent base stations will be less significant and momentarily exceeding the power-budget may be permissible. Other criteria for choosing the amount of safety margin are within the scope of the invention.

The present invention provides a novel, system, method and apparatus for allocating power between at least two communication services that share a common power budget. The invention allows the monitoring of actual power consumption on one communication service, such as a voice service, and predicts the future consumption of that service and allocates power to the voice service based on the prediction. The remainder of the power-budget is then made available to a second communication service, such as a data service. The invention is particularly useful in combined voice and data systems to ensure that power can be used by voice services and data services on an as-needed and/or as-available basis thus increasing the amount and/or reliability of data transmissions from base stations to subscriber stations. When used in a CDMA system, the invention is also a useful way to continuously reallocate system resources among different types of services without having to reallocate CDMA channels among those different types of services.

The above-described embodiments of the invention are intended to be examples of the present invention and alterations and modifications may be effected thereto, by those of skill in the art, without departing from the scope of the invention which is defined solely by the claims appended hereto.

TABLE I (Prior Art)

| Time period (Tn) | Power Allocation | | | Actual Power Consumption | | | Unused power (%) |
|---|---|---|---|---|---|---|---|
| | Signalling Channels (%) | Data Channels (%) | Voice Channels (%) | Signalling Channels (%) | Data Channels (%) | Voice Channels (%) | |
| 0 | 10 | 45 | 45 | 10 | 45 | 30 | 15 |
| 1 | 10 | 45 | 45 | 10 | 45 | 32 | 13 |
| 2 | 10 | 45 | 45 | 10 | 45 | 31 | 14 |
| 3 | 10 | 45 | 45 | 10 | 45 | 28 | 17 |
| 4 | 10 | 45 | 45 | 10 | 45 | 32 | 13 |
| 5 | 10 | 45 | 45 | 10 | 45 | 36 | 9 |
| 6 | 10 | 45 | 45 | 10 | 45 | 38 | 7 |
| 7 | 10 | 45 | 45 | 10 | 45 | 38 | 7 |
| 8 | 10 | 45 | 45 | 10 | 45 | 38 | 7 |
| 9 | 10 | 45 | 45 | 10 | 45 | 37 | 8 |
| 10 | 10 | 45 | 45 | 10 | 45 | 35 | 10 |
| 11 | 10 | 45 | 45 | 10 | 45 | 33 | 12 |
| 12 | 10 | 45 | 45 | 10 | 45 | 34 | 11 |
| 13 | 10 | 45 | 45 | 10 | 45 | 34 | 11 |
| 14 | 10 | 45 | 45 | 10 | 45 | 38 | 7 |
| 15 | 10 | 45 | 45 | 10 | 45 | 39 | 6 |
| 16 | 10 | 45 | 45 | 10 | 45 | 40 | 5 |
| 17 | 10 | 45 | 45 | 10 | 45 | 41 | 4 |
| 18 | 10 | 45 | 45 | 10 | 45 | 41 | 4 |
| 19 | 10 | 45 | 45 | 10 | 45 | 40 | 5 |
| 20 | 10 | 45 | 45 | 10 | 45 | 40 | 5 |
| 21 | 10 | 45 | 45 | 10 | 45 | 38 | 7 |
| 22 | 10 | 45 | 45 | 10 | 45 | 36 | 9 |
| 23 | 10 | 45 | 45 | 10 | 45 | 35 | 10 |
| 24 | 10 | 45 | 45 | 10 | 45 | 31 | 14 |
| 25 | 10 | 45 | 45 | 10 | 45 | 31 | 14 |

TABLE II

| Time period (Tn) | Power Allocation | | | | Actual Power Consumption | | | Unused power (%) |
|---|---|---|---|---|---|---|---|---|
| | Signalling Channels (%) | Data Channels (%) | Voice Channels (%) | Safety Margin (%) | Signalling Channels (%) | Data Channels (%) | Voice Channels (%) | |
| 0 | 10 | 45 | 45 | 5 | 10 | 45 | 30 | 15 |
| 1 | 10 | 55 | 35 | 5 | 10 | 55 | 32 | 3 |
| 2 | 10 | 53 | 37 | 5 | 10 | 53 | 31 | 6 |
| 3 | 10 | 54 | 36 | 5 | 10 | 54 | 28 | 8 |
| 4 | 10 | 57 | 33 | 5 | 10 | 57 | 32 | 1 |
| 5 | 10 | 53 | 37 | 5 | 10 | 53 | 36 | 1 |
| 6 | 10 | 49 | 41 | 5 | 10 | 49 | 38 | 3 |
| 7 | 10 | 47 | 43 | 5 | 10 | 47 | 38 | 5 |
| 8 | 10 | 47 | 43 | 5 | 10 | 47 | 38 | 5 |
| 9 | 10 | 47 | 43 | 5 | 10 | 47 | 37 | 6 |
| 10 | 10 | 48 | 42 | 5 | 10 | 48 | 35 | 7 |
| 11 | 10 | 50 | 40 | 5 | 10 | 50 | 33 | 7 |
| 12 | 10 | 52 | 38 | 5 | 10 | 52 | 34 | 4 |
| 13 | 10 | 51 | 39 | 5 | 10 | 51 | 34 | 5 |
| 14 | 10 | 51 | 39 | 5 | 10 | 51 | 38 | 1 |
| 15 | 10 | 47 | 43 | 5 | 10 | 47 | 39 | 4 |
| 16 | 10 | 46 | 44 | 5 | 10 | 46 | 40 | 4 |
| 17 | 10 | 45 | 45 | 5 | 10 | 45 | 41 | 4 |
| 18 | 10 | 44 | 46 | 5 | 10 | 44 | 41 | 5 |
| 19 | 10 | 44 | 46 | 5 | 10 | 44 | 40 | 6 |
| 20 | 10 | 45 | 45 | 5 | 10 | 45 | 40 | 5 |
| 21 | 10 | 45 | 45 | 5 | 10 | 45 | 38 | 7 |
| 22 | 10 | 47 | 43 | 5 | 10 | 47 | 36 | 7 |
| 23 | 10 | 49 | 41 | 5 | 10 | 49 | 35 | 6 |
| 24 | 10 | 50 | 40 | 5 | 10 | 50 | 31 | 9 |
| 25 | 10 | 54 | 36 | 5 | 10 | 54 | 31 | 5 |

I claim:

1. A system for allocating a power budget between at least two different communication channels, one of which comprises a voice channel and the other one of which comprises a data channel, comprising:
    at least two receiving-stations, which between them are configured to receive all of the at least two different communication channels; and,
    a transmitting-station for transmitting each of the channels to at least one of the receiving-stations using a portion of the power budget, the portions being allocated by said transmitting-station such that the power budget is substantially consumed,
    wherein said transmitting-station is configured such that the allocation of power to the voice channel for a subsequent time period is based on the actual power consumed by the voice channel for a known time period,
    wherein the known time period comprises a current time period and the subsequent time period immediately follows the current time period,
    wherein said transmitting-station is configured such that a remaining portion of the power budget is allocated to a data channel for the subsequent time period based on the amount of power that is not allocated to the voice channel for that subsequent time period, and
    wherein each of the time periods is from about one millisecond to about forty milliseconds.

2. The system according to claim 1, wherein the transmitting-station comprises a base station and the receiving-stations respectively comprise subscriber stations.

3. The system according to claim 2, wherein one of the subscriber stations is configured to receive the one channel, and another of the subscriber stations is configured to receive the other one of the channels.

4. The system according to claim 2, wherein one of the subscriber stations is configured to receive the at least two communication channels.

5. The system according to claim 1, wherein the transmitting-station comprises a subscriber station, and wherein the receiving-station comprises a base station.

6. The system according to claim 1, wherein each of the time periods is from about two milliseconds to about thirty milliseconds.

7. The system according to claim 1, wherein each of the time periods is from about five milliseconds to about twenty milliseconds.

8. The system according to claim 1, wherein each of the time periods is from about seven milliseconds to about fifteen milliseconds.

9. The system according to claim 1, wherein each of the time periods is about ten milliseconds.

10. A method of allocating a power budget between communication channels, at least one of which comprises a voice channel and at least one data channel, comprising the steps of:
    (i) for an initial time period, allocating the power budget between the communication channels over a wireless link according to a predefined allocation;
    (ii) for a current time period, establishing the communication channels according to the allocation;
    (iii) for the current time period, determining actual power consumption of the at least one voice channel;
    (iv) for a future time period, allocating at least an equivalent amount of power as the actual power consumption determined at step (iii) to the at least voice channel;
    (v) for the future time period, allocating a remaining amount of power to at least one of the data channel, the remaining amount being an amount that was unallocated to the at least one voice channel; and,
    (vi) repeating steps (iii)-(v) for the future time periods.

* * * * *